BISTABLE LOGIC CIRCUIT
Filed Feb. 8, 1966
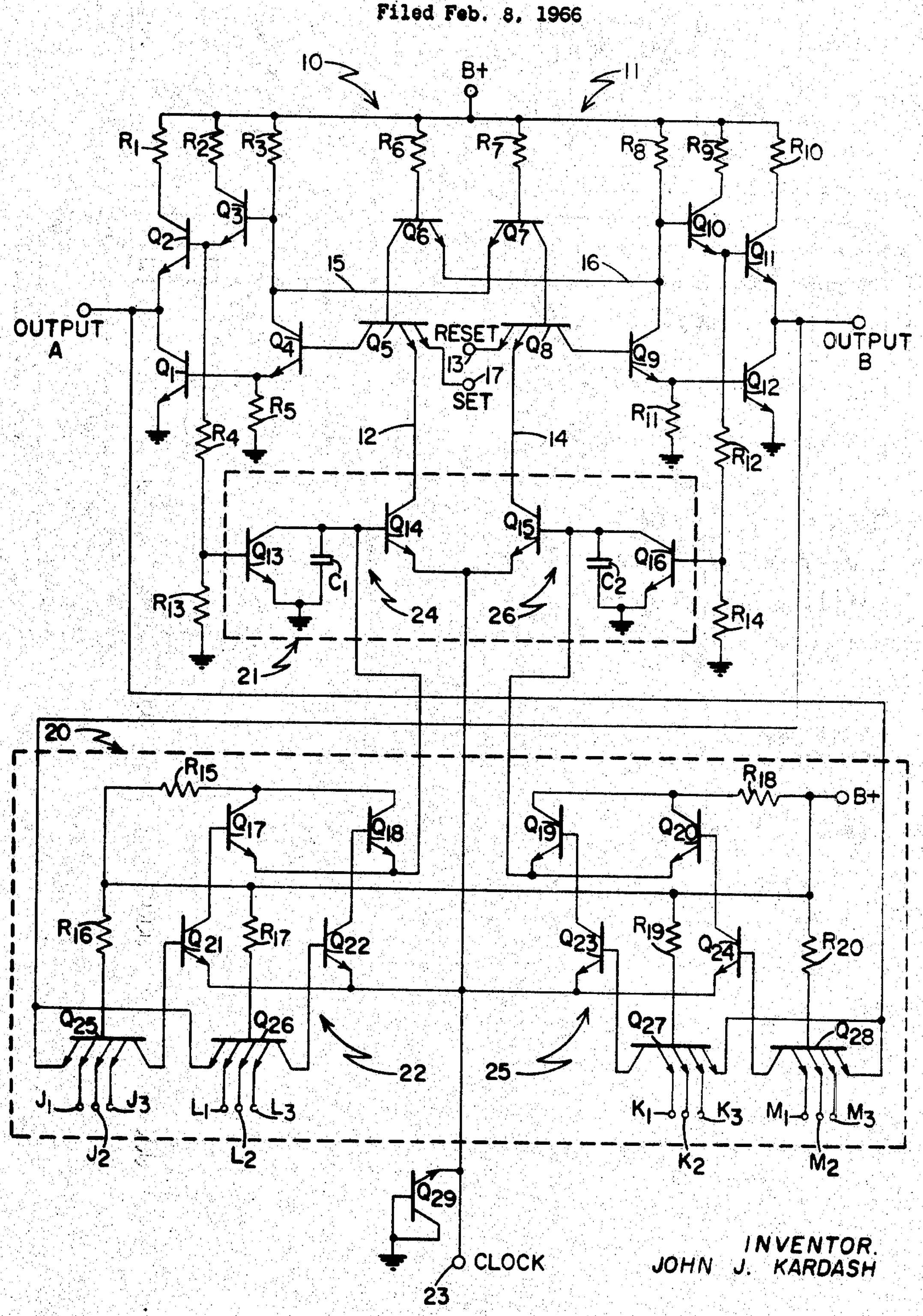
INVENTOR.
JOHN J. KARDASH
BY David M. Keay
AGENT.

United States Patent Office 3,473,051

Patented Oct. 14, 1969

3,473,051
BISTABLE LOGIC CIRCUIT

John J. Kardash, South Acton, Mass., assignor to Sylvania Electric Products Inc., a corporation of Delaware Filed Feb. 8, 1966, Ser. No. 525,894
Int. Cl. H03k 17/26
U.S. Cl. 307—269 11 Claims

ABSTRACT OF THE DISCLOSURE

Bistable circuit having a control circuit with two capacitances, two charging transistors, two switching transistors, and two discharging transistors. During a clock pulse, if input conditions are met, the appropriate charging transistor conducts and permits its associated capacitance to be charged. During the trailing edge of the clock pulse, the stored charge causes the appropriate switching transistor to conduct and switch the operating state of the bistable circuit. After the switching action has been initiated, a discharging transistor connected across the capacitance conducts and discharges the capacitance. Input signal conditions and clock pulses are applied to each charging transistor through a two-transistor input gate arrangement. Also disclosed is a flip-flop of two cross-connected elements each having three transistors.

This invention relates to bistable logic circuits. More particularly, it is concerned with flip-flop circuits and with input circuits for controlling the operating state of flip-flop circuits.

Various types of bistable circuits are employed in digital computers and electronic data processing equipment in the performance of various logic functions. One form of bistable logic current of the type commonly known as a "J–K flip-flop" is described in application Ser. No. 465,-580, filed June 21, 1965, by the inventor of the present invention and assigned to the assignee of the present application.

In the flip-flop described in the aforementioned application the operating state of the flip-flop is changed by the application of periodic clock pulses depending upon information signals present at information input terminals of the circuit. A control circuit causes a charge to be stored during the leading edge of a clock pulse when the signals at the information input terminals so direct. The stored charge is employed during the trailing edge of the clock pulse to trigger the flip-flop circuit from one operating state to another.

The circuit described in the aforementioned application has improved operating speed and triggering capabilities under extreme worst case conditions of poor triggering pulse and high fanout capacitative loading. The circuit also prevents racing in that the clock pulse, in effect, inhibits the information inputs as soon as they have been utilized. In addition, the circuit includes a discharge network such that each clock pulse removes any portion of the charge remaining from the charge stored and utilized during the previous clock pulse cycle, thereby insuring that no residual effects from the previous operating cycle interfere with the proper operation of the circuit during subsequent operating cycles.

It is an object of the present invention to provide a further improved bistable circuit.

It is also an object of the invention to provide an input circuit for handling input information and for controlling the operating state of a flip-flop circuit in which the elements of the input circuit which change the state of the flip-flop depending upon the input information received are cleared of the effects of the input information immediately after being utilized to change the state of the flip-flop circuit.

It is another object of the invention to provide an improved logic gate circuit.

Briefly, in accordance with the foregoing objects of the invention a bistable logic circuit includes a first and a second flip-flop section each having a first and a second operating condition and feedback connections between the two flip-flop sections to cause the sections to operate in different operating conditions. A control circuit has input connections from the flip-flop circuit for receiving signals indicative of the operating conditions of the flip-flop sections and output conmnections to the flip-flop sections for transmitting signals to change the operating conditions of the flip-flop sections. Periodic clock pulses are applied to the control circuit at an input signal terminal.

The control circuit includes means connected to an input connection and to the input signal terminal and operable to charge a charge storage device during the presence of a clock pulse signal at the input signal terminal. Another means in the control circuit is connected to the charge storage device and to an output connection and is operable to prevent the occurrence of a signal at the output connection during the presence of a signal at the input signal terminal. This means is also operable to employ the charge stored in the charge storage device to produce a signal at the output connection for changing the operating conditions of the flip-flop sections in response to termination of the clock pulse signal at the input signal terminal.

In addition, the control circuit includes means connecting an input connection to the charge storage device and operable to cause the charge storage device to be discharged in response to the presence of a signal at the input connection indicating that the charge stored in the charge storage device has been employed to cause a change in the operating conditions of the flip-flop sections and, therefore, no further use of the charge is required.

Additional objects, features, and advantages of logic circuits according to the invention will be apparent from the following detailed discussion and the accompanying drawing in which the single figure is a schematic circuit diagram of a bistable circuit employing the present invention.

General description

A bistable circuit according to the invention as illustrated in the figure operates to provide a high level voltage signal at either the output terminal A or the output terminal B and a low level voltage signal at the other output terminal. A positive going clock pulse of approximately the same voltage as the high level voltage signal is periodically applied to the clock input signal terminal.

There are two sets of information inputs to the circuit, each having two groups of input terminals. The terminals of one group of the first set of terminals are labeled $J_1$, $J_2$ and $J_3$, and those of the other group of the first set are labeled $L_1$, $L_2$, and $L_3$. The terminals of one group of the second set of terminals are labeled $K_1$, $K_2$, and $K_3$, and those of the other group of the second set are labeled $M_1$, $M_2$, and $M_3$. Signals of either the high level voltage or the low level voltage are applied to each of the information input terminals.

The circuit switches its operating state and consequently the voltage level at output terminals A and B in response to a clock pulse depending upon the voltage levels of the signals present at the J, K, L, and M input terminals. When a high level signal is being produced at output terminal B and a low level signal at output terminal A and the signals present at all of the J input terminals or at all of the L input terminals are at a high level, a clock pulse causes a change in the operating state of the circuit and a low level signal is produced at output terminal B and a high level signal is produced at terminal A. Similarly, the next clock pulse will restore the circuit to its original operating state if a high level signal is present at every K input terminal or at every M input terminal.

If when output terminal B is at a high level a low level signal is present at any one of the J input terminals and also at any one of the L input terminals, a clock pulse will not trigger a change in the operating state. Similarly, if when output terminal A is at the high level a low level signal is present at one or more of the K input terminals and also at one or more of the M input terminals, a clock pulse will not trigger a change in the operating state. When a high level signal is present at all the J input terminals or at all the L input terminals and a high level signal is also present at all K input terminals or at all the M input terminals, a clock pulse causes the circuit to complement, that is to change operating states. These switching characteristics categorize the circuits as a J–K type flip-flop circuit.

Flip-flop sections—description

The circuit of the single figure includes two flip-flop sections, a first flip-flop section 10 having the output terminal A and a second flip-flop section 11 having the output terminal B. Two transistors $Q_6$ and $Q_7$, each in one of the two flip-flop sections, provide a flip-flop pair. The base of each flip-flop transistor is connected to a source of positive voltage B+ through resistances $R_6$ and $R_7$, respectively.

Each of the transistors of the flip-flop pair is connected to a circuit of the type disclosed and claimed in application Ser. No. 281,183, filed May 17, 1963, by Richard E. Bohn and Richard C. Sirrine entitled "Transistor Logic Circuits" and assigned to the assignee of the present invention. As explained in detail in the Bohn and Sirrine application each flip-flop section provides a high level output signal at its output terminal when it is operating in its "off" condition, and it provides a low level signal at its output terminal when it is operating in its "on" condition. A section is turned either "on" or "off" by the occurrence of particular combinations of signals at its input.

The first NPN flip-flop transistor $Q_6$ has its collector connected directly to the base of NPN input transistor $Q_5$. The input transistor has two emitters to which input signals are applied. One emitter is connected to a set terminal 17 and the other emitter is connected to a first input connection line 12. The collector of the input transistor $Q_5$ is connected directly to the base of an NPN coupling transistor $Q_4$. The collector of the coupling transistor is connected through a collector resistance $R_3$ to the positive voltage source B+, and its emitter is connected through a pull-down resistance $R_5$ to ground. An NPN output transistor $Q_1$ has its base connected directly to the emitter of transistor $Q_4$, its emitter connected directly to ground, and its collector connected directly to the output terminal A.

Another NPN transistor $Q_3$ has its base connected directly to the collector of transistor $Q_4$, its collector connected to the positive voltage source B+ through a resistance $R_2$, and its emitter connected through two resistances $R_4$ and $R_{13}$, in series, to ground. An NPN voltage setting transistor $Q_2$ has its base connected directly to the emitter of transistor $Q_3$, its collector connected through a resistance $R_1$ to the positive voltage source B+, and its emitter connected directly to the output terminal A.

The second section 11 of the flip-flop circuit includes the second transistor $Q_7$ of the flip-flop pair and other circuitry similar to that of the first section. An input transistor $Q_8$ has its base connected directly to the collector of the flip-flop transistor $Q_7$ and its collector connected directly to the base of a coupling transistor $Q_9$. The input transistor has two emitters to which input signals are applied. One emitter is connected to a reset terminal 13 and the other emitter is connected to a second input connection line 14.

The collector of the coupling transistor $Q_9$ is connected through a resistance $R_8$ to the voltage source B+, and its emitter is connected through a resistance $R_{11}$ to ground. The emitter of the coupling transistor $Q_9$ is also connected directly to the base of an output transistor $Q_{12}$ which has its emitter connected directly to ground and its collector connected directly to the output terminal B.

A voltage setting transistor $Q_{10}$ has its base connected directly to the collector of the coupling transistor $Q_9$, its collector connected through a resistance $R_9$ to the voltage source B+, and its emitter connected through series resistances $R_{12}$ and $R_{14}$ to ground. The emitter of transistor $Q_{10}$ is also connected directly to the base of another voltage setting transistor $Q_{11}$ which has its collector connected through a resistance $R_{10}$ to the voltage source B+ and its emitter connected directly to the output terminal B.

Regenerative feedback between the first and second sections of the flip-flop circuit is provided by feedback connections 15 and 16. The first feedback connection 15 connects the collector of the first coupling transistor $Q_4$ directly to the emitter of the second flip-flop transistor $Q_7$. The second feedback connection 16 connects the collector of the second coupling transistor $Q_9$ directly to the emitter of the first flip-flop transistor $Q_6$.

Flip-flop sections—operation

The flip-flop circuit operates in the following manner, assuming the first section 10 to be in the "on" condition with the voltage at the output terminal A at the low level and the second section 11 to be in the "off" condition with the voltage at the output terminal B at the high level. High level voltages are applied at the set and reset terminals 17 and 13, respectively. The input connection lines 12 and 14 are connected to elements providing a high impedance, as will be explained in greater detail hereinafter, thereby causing a high voltage to be present at the other emitters of the input transistors $Q_5$ and $Q_8$.

When the circuit is in this operating state, current flows through resistance $R_7$ and the forward biased base-emitter junction of the second flop-flop transistor $Q_7$ to the collector of the first coupling transistor $Q_4$ which is at a low voltage because of heavy conduction through that transistor for reasons to be explained hereinafter. Current flow continues through transistor $Q_4$ and to ground through resistance $R_5$ or the base-emitter junction of transistor $Q_1$ which is in conducting condition.

Current flow through resistance $R_7$ and the base-emitter junction of the flip-flop transistor $Q_7$ creates a large voltage drop across resistance $R_7$ causing the voltage at the base of transistor $Q_7$ to be fairly low. Although transistor $Q_7$ is operating in saturation, conduction in its collector circuit is slight and the voltage at the collector remains low. This low voltage is applied to the base of the input transistor $Q_8$ causing it to operate in a low conduction condition with slight conduction in the collector circuit and a low voltage level at the collector.

The arrangement of resistances $R_8$ and $R_{11}$ connected in series with the coupling transistor $Q_9$ is such that when the low voltage from the collector of the input transistor $Q_8$ is applied to the base of transistor $Q_9$, only a very small cutoff current flows through the transistor and the series connected resistances $R_8$ and $R_{11}$. A fairly high voltage is thus established at the collector of transistor $Q_9$ and a fairly low voltage is established at the emitter.

By virtue of the fairly high voltage present at the collector of transistor $Q_9$ current cannot flow from the voltage source B+ through the resistance $R_6$ and the base emitter junction of the first transistor $Q_6$ of the flip-flop pair as it does through resistance $R_7$ and flip-flop transistor $Q_7$. The feedback voltage at the emitter of transistor $Q_6$ together with the voltage at its base biases transistor $Q_6$ to conduction causing current to flow in its collector circuit and establishing a voltage at the collector of transistor $Q_6$, which is high relative to that at the collector of the other flip-flop transistor $Q_7$. The voltage at the base of the input transistor $Q_5$ is such that since the set terminal is at a high voltage and since the first input connection line 12 provides a high impedance, current flows in the collector circuit of transistor $Q_5$ producing a relatively high voltage at the collector. The base of coupling transistor $Q_4$ thus receives a signal biasing that transistor to a high conduction condition.

Relatively heavy current flow through the coupling transistor $Q_4$ and the series connected resistances $R_3$ and $R_5$ establishes a relatively low voltage at the collector and a relatively high voltage at the emitter. As noted previously, it is this low voltage present at the emitter of the second flip-flop transistor $Q_7$ which causes transistors $Q_7$, $Q_8$, and $Q_9$ to operate in the manner previously described.

The arrangement of transistors $Q_6$, $Q_5$, and $Q_4$ with their associated circuitry provide the first element of a flip-flop, and the arrangement of transistors $Q_7$, $Q_8$, and $Q_9$ with their associated circuitry provide the second element of a flip-flop. As described, the first element of the flip-flop is operating in the "on" condition and the second element is operating in the "off" condition. These conditions can be reversed in a manner to be explained hereinafter to cause the first flip-flop element to operate in the "off" condition and the second flip-flop element to operate in the "on" condition. The feedback connections 15 and 16 from the coupling transistor of each element to the flip-flop transistor of the other tend to maintain the operating conditions of the elements.

As explained previously, when the second flip-flop element is in the "off" condition, the voltage produced at the emitter of the coupling transistor $Q_9$ is low. This voltage applied at the base of the output transistor $Q_{12}$ biases that transistor in the non-conduction condition. In this condition transistor $Q_{12}$ presents a high impedance between the output terminal B and ground.

The fairly high voltage at the collector of transistor $Q_9$ is applied to the base of transistor $Q_{10}$. However, since the sum of emitter resistances $R_{12}$ and $R_{14}$ is large compared to resistance $R_8$, transistor $Q_{10}$ is not biased to heavy conduction. A small current does flow through transistor $Q_{10}$. Only leakage current flows through transistor $Q_{11}$, and that transistor can be considered as being substantially nonconductive. The voltage drop across the forward resistances of the base-emitter diodes of transistors $Q_{10}$ and $Q_{11}$ establishes the high voltage level at the output terminal B.

With the first flip-flop element in the "on" condition the relatively high voltage at the emitter of coupling transistor $Q_4$ biases the output transistor $Q_1$ to conduction providing a low impedance path between the output terminal A and ground and establishing a low voltage level at the output terminal A. The voltage at the base of transistor $Q_3$ is relatively low, thus insuring that this transistor is only slightly conducting and that transistor $Q_2$ is in a substantially non-conducting condition maintaining the output terminal A at the low voltage signal level.

Output transistor $Q_1$ and voltage setting transistors $Q_3$ and $Q_2$ together with their associated circuitry serve as an output portion of the first flip-flop section isolating the flip-flop elements from the effects of the load connected to the output terminal A. Similarly, output transistor $Q_{12}$ and voltage setting transistors $Q_{10}$ and $Q_{11}$ serve as an isolating output portion of the second flip-flop section. The output portions are controlled by the voltage signals on the collector and emitter of the respective coupling transistors $Q_4$ and $Q_9$.

Control circuit—description

The circuitry which controls the operating state of the flip-flop includes an information input or steering circuit 20 and a charge control circuit 21. The first section 22 of the steering circuit includes a first NPN information input transistor $Q_{25}$ having its base connected to the positive voltage source B+ through a resistance $R_{16}$. As shown, the transistor has four emitters. One emitter is connected directly to output terminal B of the second flip-flop section 11. The other three emitters are connected to information input terminals labeled $J_1$, $J_2$, and $J_3$. The circuit of the first information input transistor $Q_{25}$ performs an AND logic function providing a signal at the collector in response to the presence of high level voltage signals at all the emitters.

The first section 22 of the steering circuit also includes a second NPN information input transistor $Q_{26}$ having its base connected to the positive voltage source B+ through a resistance $R_{17}$. This transistor also has four emitters, and one of the emitters is connected directly to output terminal B. The other three emitters are connected to information input terminals labeled $L_1$, $L_2$, and $L_3$. The circuit of the second information input transistor $Q_{26}$ also performs an AND logic function providing a signal at the collector in response to the presence of high level voltage signals at all the emitters.

The collector of the first information input transistor $Q_{25}$ is connected to the base of a first clock input transistor $Q_{21}$. The emitter of transistor $Q_{21}$ is connected directly to the input signal terminal 23 at which the periodic clock pulses are applied. A second clock input transistor $Q_{22}$ similarly has its base connected directly to the collector of the second information input transistor $Q_{26}$ and its emitter connected to the clock input signal terminal 23.

The collector of the first clock input transistor $Q_{21}$ is connected directly to the base of a first charging transistor $Q_{17}$. The collector of charging transistor $Q_{17}$ is connected to the positive voltage source B+ through a resistance $R_{15}$ and its emitter is connected to ground through a capacitance element $C_1$ in the first section 24 of the charge control circuit 21. The emitter of charging transistor $Q_{17}$ is also connected directly to the base of a switching transistor $Q_{14}$ in the first section 24 of the charge control circuit. The emitter of transistor $Q_{14}$ is connected directly to the clock pulse input signal terminal 23. The input connection line 12 to the emitter of input transistor $Q_5$ of the first flip-flop section 10 is connected directly to the collector of the switching transistor $Q_{14}$ providing an output connection from the first section 10 of the control circuit.

The collector of the second clock input transistor $Q_{22}$ is connected directly to the base of a second charging transistor $Q_{18}$. The collector of this charging transistor is connected directly to the collector of the first charging transistor $Q_{17}$ and its emitter is connected directly to the emitter of the first charging transistor $Q_{17}$.

Control circuit—charging operation

The first sections 22 and 24 of the control circuit operate to control the operating state of the flip-flop in the following manner. When one or more of the emitters of the first input transistor $Q_{25}$ is at the low voltage level, current does not flow in its collector circuit and the potential at the collector is low. This low voltage at the base of the first clock input transistor $Q_{21}$ biases that transistor in the non-conducting condition regardless of whether or not a high voltage clock pulse is present at the input signal terminal 23. No current flows in the collector circuit of transistor $Q_{21}$ and thus a low voltage is present at the base of the first charging transistor $Q_{17}$. Transistor $Q_{17}$ is thereby biased to a high impedance or substantially non-conducting condition. Similarly, if one or more of the emitters of the second information input transistor $Q_{26}$ is at the low voltage level, current does not flow in its collector circuit and the potential at the collector is low. The second clock input transistor $Q_{22}$ is thus in the non-conducting condition and charging transistor $Q_{18}$ is biased to a high impedance or substantially non-conducting condition.

When both charging transistors $Q_{17}$ and $Q_{18}$ are in the substantially non-conducting condition, the base of the first switching transistor $Q_{14}$ is also at a low potential. Transistor $Q_{14}$ is thus biased to a substantially non-conducting condition and represents a high impedance to the input connection line 12 to the first flip-flop section 10.

When the operating state of the flip-flop is such that the first section 10 is in the "on" condition and the second section 11 is in the "off" condition, the voltage produced at the output terminal B is at the high level. A high voltage level input signal is thus present at one of the emitters of each of the information input transistors $Q_{25}$ and $Q_{26}$. If high voltage level signals are also present at all the J input terminals or at all the L input terminals, current will flow in the collector circuit of the appropriate information input transistor $Q_{25}$ or $Q_{26}$.

When there is no clock pulse signal at the input signal terminal 23, current in the collector circuit of transistor $Q_{25}$ or $Q_{26}$ flows across the forward biased base-emitter junction of the appropriate clock input transistor $Q_{21}$ or $Q_{22}$. The heavy current flow causes the potential at the base of the clock input transistor to be low. Therefore, there is only slight conduction in the collector circuit of the clock input transistor $Q_{21}$ or $Q_{22}$ and the charging transistors $Q_{17}$ and $Q_{18}$ remain substantially non-conducting.

When an AND condition exists at the emitters of either of the information input transistors $Q_{25}$ or $Q_{26}$ by virtue of high voltage level signals being present at all the emitters of one of the transistors, the presence of a high voltage level clock pulse signal at the input signal terminal 23 reduces the current flow across the base-emitter junction of the appropriate clock input transistor $Q_{21}$ or $Q_{22}$. The voltage at the base of that transistor rises causing current flow in its collector circuit. Current flowing in the collector circuit also flows in the base of the associated charging transistor $Q_{17}$ or $Q_{18}$ biasing that transistor to conduction. In effect, a low impedance path is produced between the voltage source B+ and the capacitance $C_1$, and the capacitance $C_1$ is charged very rapidly. Thus transistors $Q_{25}$, $Q_{21}$, and $Q_{17}$ and transistors $Q_{26}$, $Q_{22}$, and $Q_{18}$ each together with associated circuitry provides a gate circuit in which a charging signal is coupled to capacitance $C_1$ by transistor $Q_{17}$ or $Q_{18}$ when appropriate input signals are applied at transistors $Q_{25}$ and $Q_{21}$ or at transistors $Q_{26}$ and $Q_{22}$.

As the capacitance $C_1$ charges, the voltage at the emitter of the charging transistors $Q_{17}$ and $Q_{18}$ and consequently at the base of switching transistor $Q_{14}$ increases. However, the high voltage level of the clock pulse signal is also present at the emitter of transistor $Q_{14}$ and, therefore, transistor $Q_{14}$ remains non-conductive. Thus, the net result of an AND condition at the emitters of either of the information input transistors $Q_{25}$ or $Q_{26}$ while a clock pulse signal is present at the input signal terminal is to store a charge in the capacitance $C_1$.

The shorted transistor $Q_{29}$ connected between the input signal terminal 23 and ground serves as a reverse biased diode which prevents the terminal from dropping below a voltage more than slightly below ground. This arrangement prevents the clock pulse terminal from becoming too negative and inadvertently biasing switching transistor $Q_{14}$ to conduction.

Control circuit—flip-flop switching operation

Upon termination of the clock pulse, the voltage at the clock pulse terminal starts to drop causing reduced conduction in the collector circuit of the conducting clock input transistor $Q_{21}$ or $Q_{22}$ and causing the associated charging transistor $Q_{17}$ or $Q_{18}$ to be biased to the non-conductive condition. The voltage at the emitter of the switching transistor $Q_{14}$ which is directly connected to the clock pulse terminal 23 is reduced.

With the reduced voltage at the emitter of transistor $Q_{14}$ and the cessation of current flow in the emitter circuit of charging transistors $Q_{17}$ and $Q_{18}$, the charging capacitance $C_1$ causes a charge to become stored in the forward biased base-emitter junction of the switching transistor $Q_{14}$ thus biasing that transistor to conduction. As the charge in the transistor is utilized, it is constantly restored by the charge in the capacitance $C_1$.

The switching transistor $Q_{14}$ thus presents a low impedance between the input connection line 12 and the low voltage level at the input signal terminal. Current flow in the collector circuit of the switching transistor $Q_{14}$ along the input connection line 12 causes heavy current flow across the forward biased base-emitter junction of the first input tnansistor $Q_5$ of the first flip-flop section 10. This heavy current flow causes reduced current flow in the collector circuit of the transistor $Q_5$.

The reduction in current flow in the collector circuit of transistor $Q_5$ causes reduced conduction in transistor $Q_4$ and the series connected resistances $R_3$ and $R_5$. Thus, the voltage at the collector of coupling transistor $Q_4$ increases and that at the emitter decreases.

With the increase in potential at the collector of the coupling transistor $Q_4$ the base-emitter junction of the second flip-flop transistor $Q_6$ is no longer forward biased, thus reducing current flow through the base resistance $R_7$ and increasing the potential at the base of the transistor $Q_7$. This action causes current to flow in the collector circuit and tends to increase the voltage at the collector of transistor $Q_7$.

Since the voltage levels at the emitters of input transistor $Q_8$ are high by virtue of the high level voltage at the reset terminal 13 and the high impedance of the non-conducting switching transistor $Q_{15}$ connected to the input connection line 14, the increased voltage at the base of transistor $Q_8$ causes current to flow in its collector circuit and increases the voltage at the collector. Transistor $Q_9$ is thereby biased to conduction and heavy current flows through the transistor and the series connected resistances $R_8$ and $R_{11}$. The voltage at the collector of the coupling transistor $Q_9$ decreases, and current flow across the forward biased base-emitter junction of the first flip-flop transistor $Q_6$ increases. This current flow reduces the voltage at the base of transistor $Q_6$, and decreases current flow in its collector circuit and the voltage at the collector.

The relatively low voltage at the base of the first input transistor $Q_5$ biases the transistor to a non-conduction condition whenever the switching transistor $Q_{14}$ is restored to the non-conducting condition providing a high impedance to the input connection line 12. Thus, the switching action is completed and the flip-flop elements maintained in their reversed operating conditions regardless of the presence or termination of the condition at the input connection line 12 which triggered the switching action.

The switching action of the flip-flop elements reverses the voltage levels present at the output terminals A and B through the output portions of the flip-flop sections connected to the coupling transistors $Q_4$ and $Q_9$. In the first flip-flop section 10 the reduced voltage at the emitter of the coupling transistor $Q_4$ biases the base of the output transistor $Q_1$ so as to render that transistor substantially non-conducting. The output transistor $Q_1$ thus presents a high impedance between the output terminal A and ground. The increased voltage at the base of transistor $Q_3$ together with the low bias voltage existing at its emitter by virtue of the low voltage level at the output terminal A causes ransistor $Q_3$ to conduct heavily thereby also causing transistor $Q_2$ to conduct heavily. These transistors conduct heavily until the voltage at the output terminal A is restored to the high level established by the supply of voltage less the forward biasing voltage drop across the base-emitter junctions of transistors $Q_3$ and $Q_2$.

The voltage at the output terminal A may not revert to the high level immediately upon termination of current flow through the output transistor $Q_1$ because of various capacitancec effects on the output terminal A and its external connections. In order for the voltage at the output terminal A to rise, this load capacitance must be charged. The heavy flow of current from the supply B+ through the voltage setting transistors $Q_3$ and $Q_2$ charges the load capacitance very rapidly. When the output terminal A reaches the high voltage level as established by the leakage current through the forward biased resistances of the base-emitter junctions of the transistors, the transistors are no longer in the heavily conducting condition and the first section of the flip-flop is in the "off" condition.

In the second flip-flop section 11 the increased current flow through the coupling transistor $Q_9$ and its series connected resistances $R_8$ and $R_{11}$ increases the voltage at the emitter of transistor $Q_9$. The output transistor $Q_{12}$ is thereby biased to conduction providing a low impedance path between the output terminal B and ground and establishing a low voltage level at the output terminal B. The second flip-flop section 11 is thus in the "on" condition.

Since the regenerative feedback connections between the flip-flop elements is taken from the coupling transistors $Q_4$ and $Q_9$, the flip-flop elements are isolated from the output terminals A and B by the output portions of the flip-flop sections. Thus, the loads at the output terminals do not affect the switching speed of the flip-flop elements. In addition, the capacitive value of the charge storage device $C_1$ may be smaller than if the stored charge were required to sustain the switching transistor $Q_{14}$ in the conduction condition until the voltage level at the output terminals A and B stabilized. The smaller capacitance also permits faster charging during the leading edge of the clock pulse.

Discharge network—description and operation

The first section 24 of the charge control circuit 21 of the control circuitry includes means for removing any excess charge remaining in the capacitance device $C_1$ after the charge stored in the capacitance has been employed to trigger the flip-flop circuit from one operating state to the other. The first capacitance device $C_1$ is shunted by a first discharging transistor $Q_{13}$ having its collector connected directly to the base of the switching transistor $Q_{14}$ and its emitter connected directly to ground. The base of the discharging transistor $Q_{13}$ is connected between the resistances $R_4$ and $R_{13}$ which are connected in series between the emitter of voltage setting transistor $Q_3$ and ground.

When the first flip-flop section 10 is in the "on" condition with the output terminal A at a low voltage level, the voltage at the emitter of transistor $Q_3$ is such that the voltage at the base of discharging transistor $Q_{13}$ biases that transistor to a substantially non-conducting condition. Under these conditions transistor $Q_{13}$ provides a high impedance shunt across the capacitance $C_1$ and the presence of the transistor has substantially no effect on the capacitance $C_1$.

When the first flip-flop element is switching from the "on" condition to the "off" condition, the voltage at the collector of the coupling transistor $Q_4$ increases and transistors $Q_3$ and $Q_2$ conduct heavily in order to restore the voltage level at output terminal A to its high level. The voltage at the emitter of transistor $Q_3$ increases, and the resulting increase of potential across resistor $R_{13}$ biases discharging transistor $Q_{13}$ to a conducting condition. Discharging transistor $Q_{13}$ thus becomes a low impedance shunt to ground for any residual charge in capacitance $C_1$ or remaining stored in the base-emitter junction of the switching transistor $Q_{14}$. Upon restoration of the output terminal A to the high voltage level, the voltage at the emitter of transistor $Q_3$ is such as to continue to bias discharging transistor $Q_{13}$ to conduction thereby assuring that capacitance $C_1$ becomes completely discharged.

The arrangement is such that the voltage required at the collector of coupling transistor $Q_4$ to cause conduction in the collector circuit of flip-flop transistor $Q_7$ is less than that required to initiate conduction through transistor $Q_3$ sufficient to bias discharging transistor $Q_{13}$ to conduction. Therefore, regardless of any effects which might delay the actions taking place, capacitance $C_1$ cannot be discharged until the switching action has proceeded to an irreversible point.

The discharging network thus operates to discharge the capacitance $C_1$ immediately upon utilization of the stored charge to effect switching of the flip-flop to the other operating state. This action is independent of the extent to which the output terminal A has been restored to the high voltage level. Therefore, the charge control circuit is cleared of the effects of the input information without experiencing delay caused by the load on the output terminal.

Additional circuitry and operation

The control circuitry includes second sections 25 and 26 of both the information input circuit 20 and the charge control circuit 21 similar to those in the first sections. Information input transistors $Q_{27}$ and $Q_{28}$ together with clock input transistors $Q_{23}$ and $Q_{24}$ and charging transistors $Q_{19}$ and $Q_{20}$ operate in the same manner as the information input transistors $Q_{25}$ and $Q_{26}$, clock input transistors $Q_{21}$ and $Q_{22}$, and charging transistors $Q_{17}$ and $Q_{18}$ of the first section of the information input circuit. Similarly switching transistor $Q_{15}$ is connected to a second charge storage device $C_2$ and its collector is connected to the second input connection line 14 to the emitter of the second input transistor $Q_8$ of the second flip-flop section 11. A discharging means employing a discharging transistor $Q_{16}$ connected in shunt across the charge storage device $C_2$ and operated from the output portion of the second flip-flop section 11 by means of a connection to the emitter of the voltage setting transistor $Q_{10}$ is similarly included.

When the operating state of the flip-flop circuit has been changed and the first section 10 is in the "off" condition and the second section 11 is in the "on" condition, the second sections 25 and 26 of the information input circuit and the charge control circuit operate in a manner similar to the first sections to switch the operating state of the flip-flop during the next clock pulse cycle, if high voltage level signals are present at all the K input terminals or at all the M input terminals. Switching will take place regardless of the information signals present at the J and L input terminals. Since one of the emitters of each of the information input transistors $Q_{25}$ and $Q_{26}$ is connected to the output terminal B which is at a low voltage level, the clock pulse will have no effect on the first section of the control circuit.

As noted previously, the set and reset terminals 17 and 13 are normally connected to a high voltage level source. The connection to either one of these terminals may be interrupted to present a low level voltage at a terminal and establish a desired operating state of the flip-flop circuit. A low level signal at the emitter of either input transistor $Q_5$ or $Q_8$ operates to trigger the flip-flop in the same manner as a low impedance presented to either of the other emitters by input connection lines 12 or 14.

Conclusion

In the bistable circuit of the invention determination of the state in which the circuit is to be operated occurs during the forward edge of the clock pulse and is dependent upon the existing operating state of the circuit and the signals present at the information input terminals at that time. If a change in the operating state of the circuit is to be made, a charge is stored in a particular charge storage device as directed by the information input circuit. With this manner of operation the clock pulse is isolated from the flip-flop and its output terminals. Therefore, the capacitance of the load and the fanout which must be driven by the output portion of the flip-flop sections have no effect on the operation of the information input circuit while a charge is being stored in a charge storage device.

Since the signals at the information input terminals are utilized during the leading edge of the clock pulse, subsequent changes in this information even though occurring prior to completion of the switching action of the flip-flop elements do not interfere with the action which has been initiated. In other words, since the information inputs are, in effect, inhibited directly by the clock pulse as soon as they are utilized and not by feedback from the flip-flop itself, racing is prevented.

The stored charge is utilized during the trailing edge of the clock pulse to trigger switching of the operating state of the flip-flop. Since the nature of the switching action which is to take place has already been determined and since triggering action only requires that the voltage at the clock pulse terminal drop sufficiently to bias the switching transistor $Q_{14}$ or $Q_{15}$ to conduction, the trailing edge of the clock pulse can be relatively long or otherwise have poor characteristics without having any adverse effect. Because the switching does not take place until the trailing edge of the clock pulse, when the output of one flip-flop is used to drive another flip-flop, the output signal will not arrive at the second flip-flop as new information until the operating state of the second flip-flop has been determined and the information inputs inhibited.

The discharge network which removes any charge left in a charge storage device assures that the control circuit is clear and that there are no residual effects from a switching action which might interfere with the action initiated by the succeeding clock pulse. The network clears the charge storage device of any excess charge immediately after the charge has been utilized to initiate the switching action, and any delay in turning a flip-flop section completely "off" because of the time required to charge the load capacitance has no effect on clearing the information stored in the charge storage capacitance $C_1$ or $C_2$.

Since the charge storage devices are cleared immediately, the set and reset terminals 17 and 13 may be actuated during a large portion of the operating cycle. If the excess charge were dissipated slowly or took place during the subsequent clock pulse, it would be necessary to wait for a suitable period of time or in some manner enable the set or reset signal to remove the charge. In order to insure that actuation of the set or reset terminals have the desired effect, the circuit must be clear of the effects of the information utilized in controlling previous switching actions. The circuit of the invention clears the circuit by discharging the charge storage capacitance immediately after switching action has become irreversible.

The clock pulse is not employed to cause discharge of a residual capacitive charge or otherwise perform work. The only components connected between the clock pulse terminal and ground are the capacitance to be charged and transistors which are each biased to an appropriate high or low conduction condition so as to charge the capacitance rapidly without dissipating the energy of the clock pulse or slowing down its rate of rise. Since the only action taking place during the presence of the clock pulse is the charging of a charge storage capacitance $C_1$ or $C_2$ during the leading edge of the pulse and the initiating of the triggering action by the trailing edge, the pulse may be of very short duration. Therefore, the pulse repetition rate may be very high.

The bistable logic circuit as described is particularly amenable to fabrication as an integrated circuit in which all similar circuit elements are produced in a body of semiconductor material at the same time in a series of masked diffusion steps. The circuit employs only transistors and resistances which are readily produced by known methods of controlled diffusion of impurities. The capacitances $C_1$ and $C_2$ may each consist of two conductive layers separated by a layer of dielectric material or they may be the capacitances across the junctions of reverse biased diodes.

Bistable logic circuits according to the invention may be employed in various digital logic systems. They may be combined to provide sub-systems such as counters and shift registers. The number of information input terminals shown is merely illustrative. The number may be reduced or increased as by fabricating the information input transistors of the information input circuit with less emitters or by including more or less information input transistors. With an existing circuit some of the input terminals could be connected together or shorted to the clock pulse terminal in order to reduce the number of input connections. It is also possible to fabricate or connect a circuit according to the invention in which there are no J, K, L, or M information inputs. Such a circuit is a simple toggle flip-flop and will change operating state each time a clock pulse signal is applied to the circuit.

While there has been shown and described what is considered a preferred embodiment of the present invention, it will be obvious to those skilled in the art that various changes and modifications may be made therein without departing from the invention as defined in the appended claims.

What is claimed is:

1. A bistable circuit including in combination:

a first flip-flop section having a first operating condition during which a first predetermined voltage level is produced at a first output terminal and having a second operating condition during which a second predetermined voltage level is produced at the first output terminal, said first flip-flop section having a first input connection means thereto and being operable in the second operating condition while a high impedance is presented to said first input connection means, a second flip-flop section having a first operating condition during which the first predetermined voltage level is produced at a second output terminal and having a second operating condition during which the second predetermined voltage level is produced at the second output terminal, said second flip-flop section having a second input connection means thereto and being operable in the second operating condition while a high impedance is presented to said second input connections means, a first feedback connection from the first flip-flop section to the second flip-flop section for causing the second flip-flop section to operate in the second operating condition when the first flip-flop section is in the first operating condition, a second feedback connection from the second flip-flop section to the first flip-flop section for causing the first flip-flop section to operate in the second operating condition when the second flip-flop section is in the first operating condition, an input signal terminal, a control circuit having a first and a second section, a first input circuit means in the first section of the control circuit operable to produce a signal at its output connection during the concurrent occurrence of the first predetermined voltage level at first and second input terminals, the second output terminal of said second flip-flop section being connected to the first input terminal of the first input circuit means and said input signal terminal being connected to the second input terminal of the first input circuit means whereby in order for said first input circuit means to produce a signal at its output connection the second flip-flop section must be in the first operating condition and the first predetermined voltage level must be present at the input signal terminal, a first charge storage device, a first charging transistor connected between the first charge storage device and a source of voltage and operable when biased to a low impedance condition to permit the first charge storage device to be charged by the source of voltage, means connecting said first charging transistor to the output connection of the first input circuit means, said means being operable to bias the first charging transistor to a high impedance condition in the absence of a signal at the output connection and to bias the first charging transistor to a low impedance condition in response to a signal at the output connection whereby the first charge storage device is charged by the source of voltage, a first switching transistor connected to the first input connection means of the first flip-flop section and operable when biased to a low impedance condition to switch the first flip-flop section from the second operating condition to the first operating condition, means connecting said first switching transistor to the first charge storage device and to the input signal terminal, said means being operable to bias the first switching transistor to a high impedance condition by the presence of the first predetermined voltage level at the input signal terminal and by the absence of a charge in the first charge storage device and being operable to bias the first switching transistor to a low impedance condition by the presence of a charge in the first charge storage device when the first predetermined voltage level is not present at the input signal terminal whereby the first flip-flop section is switched from the second operating condition to the first operating condition, a first discharging transistor connected in shunt across said first charge storage device and operable when biased to a low impedance condition to permit discharge of the first charge storage device, means connecting said first discharging transistor to the first flip-flop section, said means being operable to bias the first discharging transistor to a high impedance condition while the first flip-flop section is in the second operating condition, and being operable to bias the first discharging transistor to a low impedance condition in response to switching of the first flip-flop section from the second operating condition to the first operating condition whereby the first charge storage device is discharged, a second input circuit means in the second section of the control circuit operable to produce a signal at its output connection during the concurrent occurrence of the first predetermined voltage level at first and second input terminals, the first output terminal of said first flip-flop section being connected to the first input terminal of the second input circuit means and said input signal terminal being connected to the second input terminal of the second input circuit means whereby in order for said second input circuit means to produce a signal at its output connection the first flip-flop section must be in the first operating condition and the first predetermined voltage level must be present at the input signal terminal, a second charge storage device, a second charging transistor connected between the second charge storage device and a source of voltage and operable when biased to a low impedance condition to permit the second charge storage device to be charged by the source of voltage, means connecting said second charging transistor to the output connection of the second input circuit means, said means being operable to bias the second charging transistor to a high impedance condition in the absence of a signal at the output connection and to bias the second charging transistor to a low impedance condition in response to a signal at the output connection whereby the second charge storage device is charged by the source of voltage, a second switching transistor connected to the second input connection means of the second flip-flop section and operable when biased to a low impedance condition to switch the second flip-flop section from the second operating condition to the first operating condition, means connecting said second switching transistor to the second charge storage device and to the input signal terminal, said means being operable to bias the second switching transistor to a high impedance condition by the presence of the first predetermined voltage level at the input signal terminal and by the absence of a charge in the second charge storage device, and being operable to bias the second switching transistor to a low impedance condition by the presence of a charge in the second charge storage device when the first predetermined voltage level is not present at the input signal terminal whereby the second flip-flop section is switched from the second operating condition to the first operating condition, a second discharging transistor connected in shunt across said second charge storage device and operable when biased to a low impedance condition to permit discharge of the second charge storage device, and means connecting said second discharging transistor to the second flip-flop section, said means being operable to bias the second discharging transistor to a high impedance condition while the second flip-flop section is in the second operating condition, and being operable to bias the second discharging transistor to a low impedance condition in response to switching of the second flip-flop section from the second operating condition to the first operating condition whereby the second charge storage device is discharged.

2. A bistable circuit according to claim 1 in which:

said first charge storage device has capacitive properties, said first charging transistor has its emitter connected to ground through the first charge storage device, its collector connected to the source of voltage, and its base connected to the output connection of the first input circuit means, said first switching transistor has its emitter connected to the input signal terminal, its collector connected to the first input connection means of the first flip-flop section, and its base connected to the emitter of the first charging transistor, said first discharging transistor has its emitter connected to ground, its collector connected to the base of the first switching transistor, and its base connected to the first flip-flop section, said second charge storage device has capacitive properties, said second charging transistor has its emitter connected to ground through the second charge storage device, its collector connected to the source of voltage, and its base connected to the output connection of the second input circuit means, said second switching transistor has its emitter connected to the input signal terminal, its collector connected to the second input connection means of the second flip-flop section, and its base connected to the emitter of the second charging transistor, and said second discharging transistor has its emitter connected to ground, its collector connected to the base of the second switching transistor, and its base connected to the second flip-flop section.

3. A bistable circuit including in combination:

a first element of a flip-flop and a second element of a flip-flop, a first means in said first element of the flip-flop having an input connection thereto and an output connection therefrom, a second coupling circuit means in said second element of the flip-flop having a first operating condition and a second operating condition, means connecting the second coupling circuit means to the input connection of the first means and operable to cause the first means to operate in a first operating condition when the second coupling circuit means is in the second operating condition and to cause the first means to operate in a second opperating condition when the second coupling circuit means is in the first operating condition, a first input circuit means in said first element of the flip-flop connected to the output connection from the first means and having an input connection thereto, said first input circuit means being operable in a first operating condition in response to the presence of a first signal condition at the input connection thereto, being operable in the first operating condition when the first means is in the first operating condition, and being operable in a second operating condition in response to the presence of a second signal condition at the input connection thereto when the first means is in the second operating condition, a first coupling circuit means in said first element of the flip-flop having a first operating condition and a second operating condition, means connecting the first input circuit means to the first coupling circuit means and operable to cause the first coupling circuit means to operate in the first operating condition when the first input circuit means is in the first operating condition and operable to cause the first coupling circuit means to operate in the second operating condition when the first input circuit means is in the second operating condition, a second means in said second element of the flip-flop having an input connection thereto and an output connection therefrom, means connecting the first coupling circuit means to the input connection of the second means and operable to cause the second means to operate in a first operating condition when the first coupling circuit means is in the second operating condition and to cause the second means to operate in the second operating condition when the first coupling circuit means is in the first operating condition, a second input circuit means in said second element of of the flip-flop connected to the output connection from the second means and having an input connection thereto, said second input circuit means being operable in a first operating condition in response to the presence of a first signal condition at the input connection thereto, being operable in the first operating condition when the second means is in the first operating condition, and being operable in a second operating condition in response to the presence of a second signal condition at the input connection thereto when the second means is in the second operating condition, and means connecting the second input circuit means to the second coupling circuit means and operable to cause the second coupling circuit means to operate in the first operating condition when the second input circuit means is in the first operating condition and operable to cause the second coupling circuit means to operate in the second operating condition when the second input circuit means is in the second operating condition.

4. A bistable circuit according to claim 3 in which:

said first means includes a transistor having its base connected to a first source of reference potential, its emitter connected to said second coupling circuit means, and its collector connected to said first input circuit means, said first input circuit means includes a transistor having its base connected to the collector of the transistor of the first means, its collector connected to the first coupling circuit means, and its emitter providing the input connection, said first coupling circuit means includes a transistor having its collector connected to the first source of reference potential and to the input connection of the second means, its emitter connected to a second source of reference potential, and its base connected to the collector of the transistor of the first input circuit means, said second means includes a transistor having its base connected to the first source of reference potential, its emitter connected to the collector of the transistor of the first coupling circuit means, and its collector connected to said second input circuit means, said second input circuit means includes a transistor having its base connected to the collector of the transistor of the second means, its collector connected to the second coupling circuit means, and its emitter providing the input connection, and said second coupling circuit means includes a transistor having its collector connected to the first source of reference potential and to the emitter of the transistor of the first means, its emitter connected to the second source of reference potential, and its base connected to the collector of the transistor of the second input circuit means.

5. A bistable circuit according to claim 3 including:

a control circuit means connected to the input connection to the first input circuit means and to the input connection to the second input circuit means, said control circiut means being operable to produce the second signal condition at said input connections and being operable to produce the first signal condition at the input connection to the input circuit means operating in the second operating condition.

6. A bistable circuit according to claim 3 including:

a first output circuit means connected to said first coupling circuit means and operable to produce a first output voltage level at a first output terminal when said first coupling circuit means is in the first operating condition and operable to produce a second output voltage level at the first output terminal when said first coupling circuit means is in the second operating condition, and a second output circuit means connected to said second coupling circuit means and operable to produce the first output voltage level at a second terminal when said second coupling circuit means is in the first operating condition and operable to produce the second output voltage level at the second output terminal when said second coupling circuit means is in the second operating condition.

7. A bistable circuit according to claim 6 including:

a control circuit having a first and a second section, and input signal terminal, a first input control circuit means in the first section of the control circuit connected to said second output terminal of the second output circuit means and to the input signal terminal and operable to produce a signal at its output connection during the presence of an input signal at said input signal terminal while the second output terminal is at the first voltage level, a first charge storage device in the first section of the control circuit, means in the first section of the control circuit connected to the output connection of the first input control circuit means and to the first charge storage device and operable to charge the first charge storage device in response to the presence of a signal at the output connection of the first input control circuit means, switching means in the first section of the control circuit connected to the first charge storage device, the input signal terminal, and the input connection to the first input circuit means in said first flip-flop element, said switching means being operable to produce the second signal condition at the input connection, and being operable to produce the first signal condition at the input connection in response to a charge in the first charge storage device and to termination of the signal at said input signal terminal, discharge means in the first section of the control circuit connected to the first charge storage device and to the first output circuit means and operable to discharge the first charge storage device in response to switching of the first coupling circuit means to the first operating condition, a second input control circuit means in the second section of the control circuit connected to said first output terminal of the first output circuit means to the input signal terminal and operable to produce a signal at its output connection during the presence of an input signal at said input signal terminal while the first output terminal is at the first voltage level, a second charge storage device in the second section of the control circuit, means in the second section of the control circuit connected to the output connection of the second input control circuit means and to the second charge storage device and operable to charge the second charge storage device in response to the presence of a signal at the output connection of the second input control circuit means, switching means in the second section of the control circuit connected to the second charge storage device, the input signal terminal, and the input connection to the second input circuit means in said second flip-flop element, said switching means being operable to produce the second signal condition at the input connection, and being operable to produce the first signal condition at the input connection in response to a charge in the second charge storage device and to termination of the signal at said input signal terminal, and discharge means in the second section of the control circuit connected to the second charge storage device and to the second output circuit means and operable to discharge the second charge storage device in response to switching of the second coupling circuit means to the first operating condition.

8. A bistable circuit including in combination:

a first element of a flip-flop having a first operating condition and a second operating condition, a second element of a flip-flop having a first operating condition and a second operating condition, feedback connections between the first and second elements of the flip-flop for causing the elements of the flip-flop to operate in different operating conditions, a control circuit having input connecting means from the first and second elements of the flip-flop and output connecting means to the first and second elements of the flip-flop, said control circuit including a first charge storage device and a second charge storage device, an input signal terminal connected to the control circuit, a first charging circuit means in said control circuit connected to the first charge storage device and operable when biased to a low impedance condition to cause a charge to be stored in the first charge storage device, means in said control circuit connecting said first charging circuit means to an input connecting means and to the input signal terminal, said means being operable to bias the first charging circuit means to a high impedance condition in the absence of an input signal at said input signal terminal and to bias the first charging circuit means to a low impedance condition during the presence of an input signal at said input signal terminal while the second element of the flip-flop is in the first operating condition and the first element of the flip-flop is in the second operating condition, a first switching circuit means in said control circuit connected to the first charge storage device, the input signal terminal, and an output connecting means, said first switching circuit means being biased to a high impedance condition during the presence of an input signal at the input signal terminal and being operable to trigger the first element of the flip-flop to the first operating condition and the second element of the flip-flop to the second operating condition in response to a charge in the first charge storage device and to termination of the signal at said input signal terminal, a first discharging means in said control circuit connected to an input connecting means and the first charge storage device and operable to cause the first charge storage device to be discharged in response to triggering of the first element of the flip-flop to the first operating condition and the second element of the flip-flop to the second operating condition, a second charging circuit means in said control circuit connected to the second charge storage device and operable when biased to a low impedance condition to cause a charge to be stored in the second charge storage device, means in said control circuit connecting said second charging circuit means to an input connecting means and to the input signal terminal, said means being operable to bias the second charging circuit means to a high impedance condition in the absence of an input signal at said input signal terminal and to bias the second charging circuit means to a low impedance condition during the presence of an input signal at said input signal terminal while the first element of the flip-flop is in the first operating condition and the second element of the flip-flop is in the second operating condition, a second switching circuit means in said control circuit connected to the second charge storage device, the input signal terminal, and an output connecting means, said second switching circuit means being biased to a high impedance condition during the presence of an input signal at the input signal terminal and being operable to trigger the second element of the flip-flop to the first operating condition and the first element of the flip-flop to the second operating condition in response to a charge in the second charge storage device and to termination of the signal at said input signal terminal, and a second discharging means in said control circuit connected to an input connecting means and the second charge storage device and operable to cause the second charge storage device to be discharged in response to triggering of the second element of the flip-flop to the first operating condition and the first element of the flip-flop to the second operating condition.

9. A bistable circuit including in combination:

a first element of flip-flop having a first operating condition and a second operating condition, a second element of a flip-flop having a first operating condition and a second operating condition, feedback connections between the first and second elements of the flip-flop for causing the elements of the flip-flop to operate in different operating conditions, a control circuit having input connecting means from the first and second elements of the flip-flop and output connecting means to the first and second elements of the flip-flop, said control circuit including a first charge storage device and a second charge storage device.

an input signal terminal connected to the control circuit, a first charging transistor in said control circuit connected between the first charge storage device and a source of voltage and operable when biased to a low impedance condition to permit the first charge storage device to be charged by the source of voltage, means in said control circuit connecting the first charging transistor to an input connecting means and to the input signal terminal, said means being operable to bias the first charging transistor to a high impedance condition in the absence of an input signal at said input signal terminal and to bias the first charging transistor to the low impedance condition during the presence of an input signal at said input signal terminal while the second element of the flip-flop is in the first operating condition and the first element of the flip-flop is in the second operating condition, a first switching transistor in said control circuit connected to an output connecting means and operable when biased to a low impedance condition to switch the first element of the flip-flop from the second operating condition to the first operating condition, means in said control circuit connecting the first switching transistor to the first charge storage device and to the input signal terminal, said means being operable to bias the first switching transistor to a high impedance condition during the presence of an input signal at the input signal terminal and by the absence of a charge in the first charge storage device and being operable to bias the first switching transistor to a low impedance condition by the presence of a charge in the first charge storage device during the absence of an input signal at the input signal terminal, a first discharging transistor in said control circuit connected to the first charge storage device and operable when biased to a low impedance condition to permit discharge of the first charge storage device, means connecting the first discharging transistor to the first element of the flip-flop, said means being operable to bias the first discharging transistor to a high impedance condition while the first element of the flip-flop is in the second operating condition, and being operable to bias the first discharging transistor to a low impedance condition in response to switching of the first element of the flip-flop from the second operating condition to the first operating condition, a second charging transistor in said control circuit connected between the second charge storage device and the source of voltage and operable when biased to a low impedance condition to permit the second charge storage device to be charged by the source of voltage, means in said control circuit connecting the second charging transistor to an input connecting means and to the input signal terminal, said means being operable to bias the second charging transistor to a high impedance condition in the absence of an input signal at said input signal terminal and to bias the second charging transistor to the low impedance condition during the presence of an input signal at said input signal terminal while the first element of the flip-flop is in the first operating condition and the second element of the flip-flop is in the second operating condition, a second switching transistor in said control circuit connected to an output connecting means and operable when biased to a low impedance condition to switch the second element of the flip-flop from the second operating condition to the first operating condition, means in said control circuit connecting the second switching transistor to the second charge storage device and to the input signal terminal, said means being operable to bias the second switching transistor to a high impedance condition during the presence of an input signal at the input signal terminal and by the absence of a charge in the second charge storage device and being operable to bias the second switching transistor to a low impedance condition by the presence of a charge in the second charge storage device during the absence of an input signal at the input signal terminal, a second discharging transistor in said control circuit connected to the second charge storage device and operable when biased to a low impedance condition to permit discharge of the second charge storage device, and means connecting the second discharging transistor to the second element of the flip-flop, said means being operable to bias the second discharging transistor to a high impedance condition while the second element of the flip-flop is in the second operating condition, and being operable to bias the second discharging transistor to a low impedance condition in response to switching of the second element of the flip-flop from the second operating condition to the first operating condition.

10. A bistable circuit including in combination:

a first flip-flop section having a first operating condition and a second operating condition and operable to produce a signal at a first output terminal indicative of the operating condition, a second flip-flop section having a first operating condition and a second operating condition and operable to produce a signal at a second output terminal indicative of the operating condition, a first feedback connection from the first flip-flop section to the second flip-flop section for causing the second flip-flop section to operate in the second operating condition when the first flip-flop section is in the first operating condition, a second feedback connection from the second flip-flop section to the first flip-flop section for causing the first flip-flop section to operate in the second operating condition when the second flip-flop section is in the first operating condition, an input signal terminal, a control circuit having a first section and a second section, a first input circuit means in the first section of the control circuit connected to the second output terminal of said second flip-flop section and the input signal terminal and operable to produce a signal at its output connection during the presence of an input signal at said input signal terminal while the second flip-flop section is in the first operating condition, a first charge storage device in the first section of the control circuit, first charging means in the first section of the control circuit connected to the first charge storage device and operable when biased to a low impedance condition to cause a charge to be stored in the first charge storage device, means in the first section of the control circuit connected to the output connection of the first input circuit means and to the first charging means, said means being operable to bias the first charging means to a high impedance condition in the absence of a signal at the output connection of the first input circuit means and to bias the first charging means to a low impedance condition in response to the presence of a signal at the output connection of the first input circuit means, first switching means in the first section of the control circuit connected to the first charge storage device, the input signal terminal, and the first flip-flop section, said first switching means being operable when biased to a low impedance condition to switch the first flip-flop section from the second operating condition to the first operating condition, said first switching means being biased to a high impedance condition during the presence of an input signal at the input signal terminal and being biased to a low impedance condition in response to a charge in the first charge storage device and to termination of the signal at the input signal terminal, first discharging means in the first section of the control circuit connected to the first charge storage device and to the first flip-flop section and operable to discharge the first charge storage device in response to switching of the first flip-flop section to the first operating condition, a second input circuit means in the second section of the control circuit connected to the first output terminal of said first flip-flop section and the input signal terminal and operable to produce a signal at its output connection during the presence of an input signal at said input signal terminal while the first flip-flop section is in the first operating condition, a second charge storage device in the second section of the control circuit, second charging means in the second section of the control circuit connected to the second charge storage device and operable when biased to a low impedance condition to cause a charge to be stored in the second charge storage device, means in the second section of the control circuit connected to the output connection of the second input circuit means and to the second charging means, said means being operable to bias the second charging means to a high impedance condition in the absence of a signal at the output connection of the second input circuit means and to bias the second charging means to a low impedance condition in response to the presence of a signal at the output connection of the second input circuit means, second switching means in the second section of the control circuit connected to the second charge storage device, the input signal terminal, and the second flip-flop section, said second switching means being operable when biased to a low impedance condition to switch the second flip-flop section from the second operating condition to the first operating condition, said second switching means being biased to a high impedance condition during the presence of an input signal at the input signal terminal and being biased to a low impedance condition in response to a charge in the second charge storage device and to termination of the signal at the input signal terminal, second discharge means in the second section of the control circuit connected to the second charge storage device and to the second flip-flop section and operable to discharge the second charge storage device in response to switching of the second flip-flop section to the first operating condition.

11. A bistable circuit including in combination:

a first flip-flop section having a first operating condition and a second operating condition and operable to produce a signal at a first output terminal indicative of the operating condition, a second flip-flop section having a first operating condition and a second operating condition and operable to produce a signal at a second output terminal indicative of the operating condition, a first feedback connection from the first flip-flop section to the second flip-flop section for causing the second flip-flop section to operate in the second operating condition when the first flip-flop section is in the first operating condition, a second feedback connection from the second flip-flop section to the first flip-flop section for causing the first flip-flop section to operate in the second operating condition when the second flip-flop section is in the first operating condition, an input signal terminal, a control circuit having a first section and a second section, a first input circuit means in the first section of the control circuit connected to the second output terminal of said second flip-flop section and the input signal terminal and operable to produce a signal at its output connection during the presence of an input signal at said input signal terminal while the second flip-flop section is in the first operating condition, a first charge storage device in the first section of the control circuit, a first charging transistor in the first section of the control circuit connected between the first charge storage device and a source of voltage and operable when biased to a low impedance condition to permit the first charge storage device to be charged by the source of voltage, means in the first section of the control circuit connected to the output connection of the first circuit means and to the first charging transistor, said means being operable to bias the first charging transistor to a high impedance condition in the absence of a signal at the output connection of the first input circuit means and to bias the first charging transistor to a low impedance condition in response to the presence of a signal at the output connection of the first input circuit means, a first switching transistor in the first section of the control circuit connected to the first flip-flop section and operable when biased to a low impedance condition to switch the first flip-flop section from the second operating condition to the first operating condition, means in the first section of the control circuit connecting the first switching transistor to the first charge storage device and to the input signal terminal, said means being operable to bias the first switching transistor to a high impedance condition during the presence of an input signal at the input signal terminal and by the absence of a charge in the first charge storage device and being operable to bias the first switching transistor to a low impedance condition by the presence of a charge in the first charge storage device during the absence of an input signal at the input signal terminal, a first discharging transistor in the first section of the control circuit connected in shunt across the first charge storage device and operable when biased to a low impedance condition to permit discharge of the first charge storage device, means connecting said first discharging transistor to the first flip-flop section, said means being operable to bias the first discharging transistor to a high impedance condition while the first flip-flop section is in the second operating condition, and being operable to bias the first discharging transistor to a low impedance condition in response to switching of the first flip-flop section from the second operating condition to the first operating condition, a second input circuit means in the second section of the control circuit connected to the first output terminal of said first flip-flop section and the input signal terminal and operable to produce a signal at its output connection during the presence of an input signal at said input signal terminal while the first flip-flop section is in the first operating condition, a second charge storage device in the second section of the control circuit, a second charging transistor in the second section of the control circuit connected between the second charge storage device and the source of voltage and operable when biased to a low impedance condition to permit the second charge storage device to be charged by the source of voltage, means in the second section of the control circuit connected to the output connection of the second input circuit means and to the second charging transistor, said means being operable to bias the second charging transistor to a high impedance condition in the absence of a signal at the output connection of the second input circuit means and to bias the second charging transistor to a low impedance condition in response to the presence of a signal at the output connection of the second input circuit means, a second switching transistor in the second section of the control circuit connected to the second flip-flop section and operable when biased to a low impedance condition to switch the second flip-flop section from the second operating condition to the first operating condition, means in the second section of the control circuit connecting the second switching transistor to the second charge storage device and to the input signal terminal, said means being operable to bias the second switching transistor to a high impedance condition during the presence of an input signal at the input signal terminal and by the absence of a charge in the second charge storage device and being operable to bias the second switching transistor to a low impedance condition by the presence of a charge in the second charge storage device during the absence of an input signal at the input signal terminal, a second discharging transistor in the second section of the control circuit connected in shunt across the second charge storage device and operable when biased to a low impedance condition to permit discharge of the second charge storage device, and means connecting said second discharging transistor to the second flip-flop section, said means being operable to bias the second discharging transistor to a high impedance condition while the second flip-flop section is in the second operating condition, and being operable to bias the second discharging transistor to a low impedance condition in response to the second flip-flop section from the second operating condition to the first condition.

References Cited

UNITED STATES PATENTS

| | | | |
|---|---|---|---|
| 2,816,237 | 12/1957 | Hageman | 307—247 |
| 2,894,215 | 7/1959 | Toy | 307—235 |
| 2,916,637 | 12/1959 | Wanlass | 307—292 |
| 3,069,565 | 12/1962 | Van Ness | 307—247 |
| 3,237,024 | 2/1966 | Mavity | 307—269 |
| 3,259,757 | 6/1966 | Lavin | 307—247 |
| 3,292,014 | 12/1966 | Brooksby | 307—291 |
| 3,305,728 | 2/1967 | Bailey | 307—292 |

OTHER REFERENCES

NEREM RECORD: 1965 Meeting Session: Microelectronics II, Nov. 4, 1965, "High Level Transistor Logic Flip-Flop."

JOHN S. HEYMAN, Primary Examiner

H. A. DIXON, Assistant Examiner